United States Patent [19]
Watanabe

[11] Patent Number: 5,892,642
[45] Date of Patent: Apr. 6, 1999

[54] MAGNETIC DISK CARTRIDGE

[75] Inventor: Seiichi Watanabe, Kanagawa-ken, Japan

[73] Assignees: Iomega Corporation, Roy, Utah; Fuji Photo Film Co., Ltd., Kanagawa-ken, Japan

[21] Appl. No.: 847,379

[22] Filed: Aug. 1, 1996

[51] Int. Cl.[6] .................................................. G11B 23/03
[52] U.S. Cl. .......................................... 360/133; 369/291
[58] Field of Search ........................... 360/133; 369/291; 206/308.1, 308.3

[56] References Cited

U.S. PATENT DOCUMENTS

| | | | |
|---|---|---|---|
| 5,689,393 | 11/1997 | Watanabe | 360/133 |
| 5,724,217 | 3/1998 | Oishi | 360/133 |
| 5,761,015 | 6/1998 | Oishi | 360/133 |

*Primary Examiner*—Willaim J. Klimowicz
*Attorney, Agent, or Firm*—Sughrue, Mion, Zinn, Macpeak & Seas, PLLC

[57] ABSTRACT

A magnetic disk cartridge has a magnetic head access opening formed in one side surface of a flat cassette shell having a top surface, a bottom surface and side surfaces. A shutter member provided to be slidable on the cassette shell for opening and closing the magnetic head access opening is constituted as a sectionally ⌐-shaped member formed by interconnecting a pair of upper wings, a shutter section and a pair of lower wings that extend respectively along the top surface, one side surface and the bottom surface. Portions of the top surface and the bottom surface of the cassette shell other than those adjacent to the one side surface portion formed with the magnetic head access opening are formed with recesses for receiving and guiding the upper wings and the lower wings of the shutter member. The structure enables sufficient wall thickness to be secured at the portion of the cassette shell near the magnetic head access opening, effectively minimizes invasion of dust, provides stable strength preventing easy deformation of the magnetic head access opening, and enables the shutter member slidably mounted on the cassette shell to slide smoothly at all times.

10 Claims, 6 Drawing Sheets

MAGNETIC DISK CARTRIDGE

BACKGROUND OF THE INVENTION

1. Field of the Invention

The present invention relates to a magnetic disk cartridge, and more particularly to an improved magnetic head access opening and shutter structure in a magnetic disk cartridge having a rotatable magnetic disk encased in a cassette shell.

2. Description of the Related Art

A magnetic disk cartridge comprises a magnetic disk for magnetically recording analog and/or digital signals rotatably encased in a thin cassette shell. The cassette shell is formed in the shape of a flat prism (substantially a hexahedron) with a top surface slightly larger than the magnetic disk, a bottom surface having an opening through which a center core supporting the center of the magnetic disk is exposed and narrow side surfaces extending between the outer peripheral edges of the top and bottom surfaces. The magnetic disk cartridge is provided with a magnetic head access opening for insertion/withdrawal of magnetic heads used for magnetic recording and reproducing so as to enable the magnetic heads to be brought into contact with, or close to, the opposite surfaces of the magnetic disk from the exterior. The magnetic head access opening is equipped with a shutter for preventing invasion of dust and the like when the opening is not in use.

The magnetic head access opening of the prior art magnetic disk cartridge is a slender opening of substantially rectangular shape formed in the top and bottom surfaces of the cassette shell to extend in the radial direction of the magnetic disk. The shutter member for opening/closing the magnetic head access opening is a piece of thin sheet metal of ⌐-shaped section which extends along both the top and bottom surfaces of the cassette shell and also over the side surface between them. The top and bottom surfaces of the cassette shell are formed with shallow recesses constituting stepped regions for accommodating and guiding the shutter member.

However, it is not absolutely necessary for the magnetic head access opening to be formed in the top and bottom surfaces of the cassette shell to extend in the radial direction of the magnetic disk. Specifically, it can be provided at any location so long as it enables the magnetic heads to be brought in contact with, or close to, the opposite surfaces of the magnetic disk over the full radius thereof from the exterior. The opening is preferably as small as possible so as to minimize invasion of dust into the cartridge. The ability to fabricate smaller magnetic heads has afforded greater freedom in the positioning and sizing of the magnetic head access opening and has even made it possible to realize the desired small magnetic head access opening by providing the opening only in a side surface rather than in the top and/or bottom surface. This can be achieved by forming the narrow side surface of the cassette shell with a magnetic head access opening of a size enabling access to the opposite surfaces of the magnetic disk from the exterior and inserting/withdrawing thin, arm-shaped pickups having tiny magnetic heads attached at their tips through this hole to conduct recording and reproduction while moving the pickups in the radial direction of the magnetic disk.

Although a magnetic disk cartridge having a magnetic head access opening of this type can be equipped with a shutter member similar to that of the prior-art magnetic disk cartridge, adoption of the same structure causes problems. This is because the shallow recesses formed in the top and bottom surfaces of the cassette shell as stepped regions for guiding the shutter member reduce the thickness of the main walls of the cassette shell to the extent that the main wall thicknesses at the portion where the magnetic head access opening is provided in the side wall of the cassette shell become so extremely thin as to make the magnetic head access opening susceptible to deformation during fabrication of the cassette shell or during use of the magnetic disk cartridge. The extreme thinness of the main walls at this portion also degrades the strength of the magnetic disk cartridge. Deformation of the magnetic head access opening portion prevents the shutter member slidably mounted on the cassette shell from sliding smoothly. This is liable to make opening and closing of the shutter member difficult or impossible.

SUMMARY OF THE INVENTION

The object of this invention is to overcome the aforesaid problems by providing a magnetic disk cartridge whose magnetic head access opening does not easily deform, which exhibits stable strength, and whose shutter member slidably mounted on the cassette shell is always able to slide smoothly.

For achieving this object, the present invention provides a magnetic disk cartridge comprising a cassette shell formed as a flat prism with a top surface slightly larger than a magnetic disk encased in the cassette shell, a bottom surface of approximately the same shape as, and parallel to, the top surface, and narrow side surfaces extending between outer peripheral edges of the top and bottom surfaces, a magnetic head access opening formed in one side surface of the cassette shell for enabling magnetic reproducing and recording heads to be brought in contact with, or close to, opposite surfaces of the magnetic disk from the exterior, and a shutter member constituted as a sectionally ⌐-shaped sheet member formed by interconnecting at least one upper wing, a shutter section and at least one lower wing that extend respectively along said top, one side and bottom surfaces, wherein the shutter member is provided on the cassette shell to be slidable along said surfaces for opening and closing the magnetic head access opening and portions of the top surface and the bottom surface of the cassette shell other than those adjacent to the one side surface portion formed with the magnetic head access opening are formed with recesses for receiving and guiding the upper wing and the lower wing of the shutter member.

By defining the magnetic head access opening to be formed in the one side surface is meant that it is formed only in the side surface and not in the top surface and/or the bottom surface.

In one specific aspect of the invention, for example, the shutter member has a pair of upper wings and a pair of lower wings, the members of each pair of wings are located on opposite sides of the top surface portion or the bottom surface portion adjacent to the one side surface portion formed with the magnetic head access opening, the shutter section is located between and connected with the four wings of the two pairs of wings, and the shutter section has a closed portion sized to cover the magnetic head access opening and an open portion adjoining the closed portion and sized to open the magnetic head access opening.

In another aspect of the invention, the shutter member has a pair of upper wings and a pair of lower wings with the members of each pair of wings being located on opposite sides of the top surface portion or the bottom surface portion adjacent to the one side surface portion formed with the magnetic head access opening and being connected by a connecting portion at a position apart from the one side surface, the shutter section is located between and connected with the four wings of the two pairs of wings, and the shutter section has a closed portion sized to cover the magnetic head access opening and an open portion sized to open the magnetic head access opening.

In another aspect of the invention, the shutter member has a pair of upper wings and a pair of lower wings with the members of each pair of wings being located apart from each other and the shutter section has two shutter subsections each connected with one upper wing and one lower wing, one of the shutter subsections constituting a closed portion of the shutter section, and the two shutter subsections being separated from each other to form therebetween a space constituting an open portion of the shutter section (as in the second embodiment described later). Alternatively, the open portion can be formed between the two shutter subsections and the two shutter subsections connected by edge members defining the opening of the open portion (as in the third embodiment described later).

In any of the foregoing aspects of the invention, the magnetic disk cartridge can be further provided with biasing means for urging the shutter member in the direction of closing the magnetic head access opening.

DESCRIPTION OF THE PREFERRED EMBODIMENTS

The magnetic disk cartridge of the present invention will hereinbelow be described with reference to the accompanying drawings.

Figure 1:
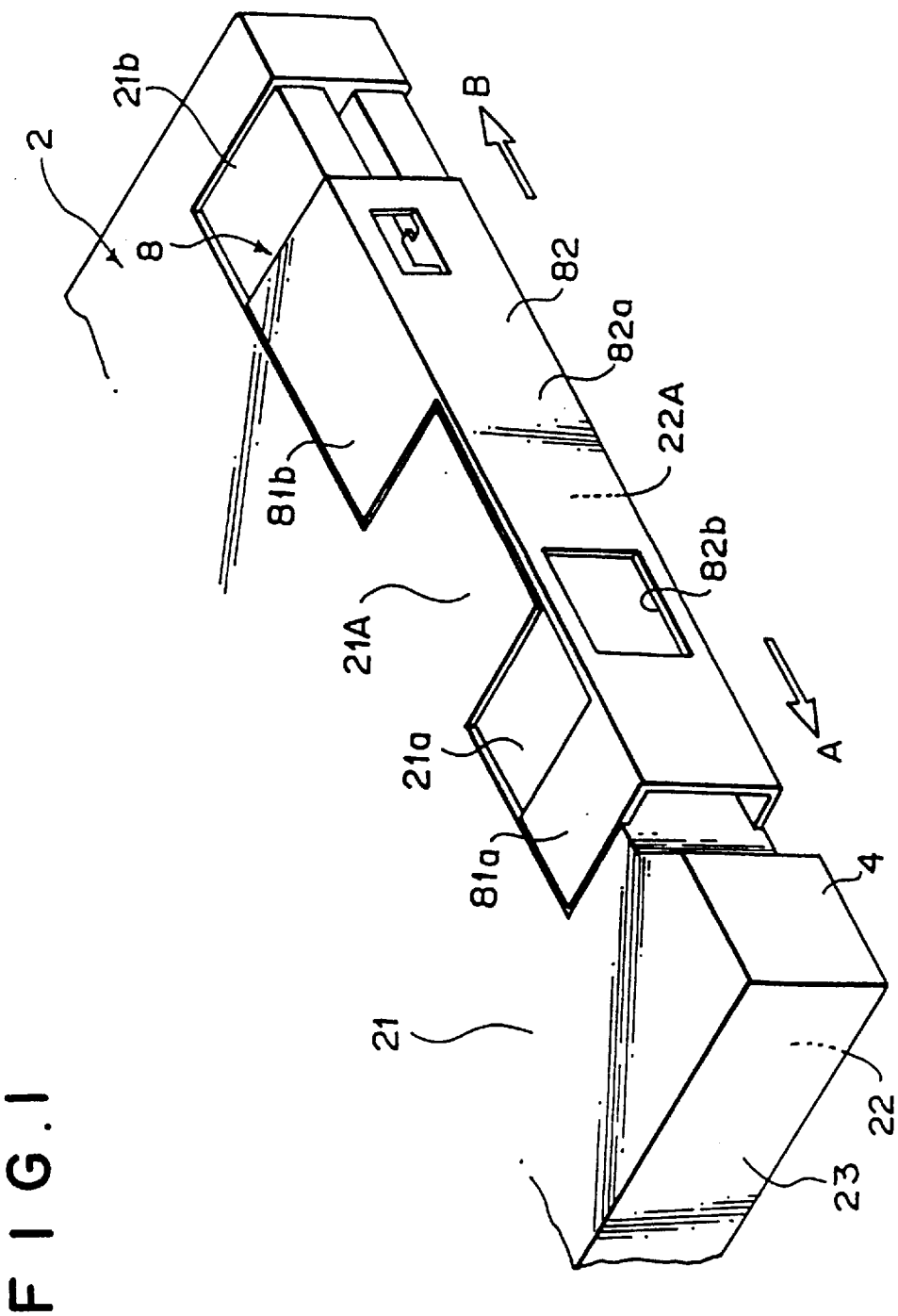
FIG. 1 is a partial perspective view of a magnetic disk cartridge which is a first embodiment of the invention shown with its shutter member closed.
Figure 2:
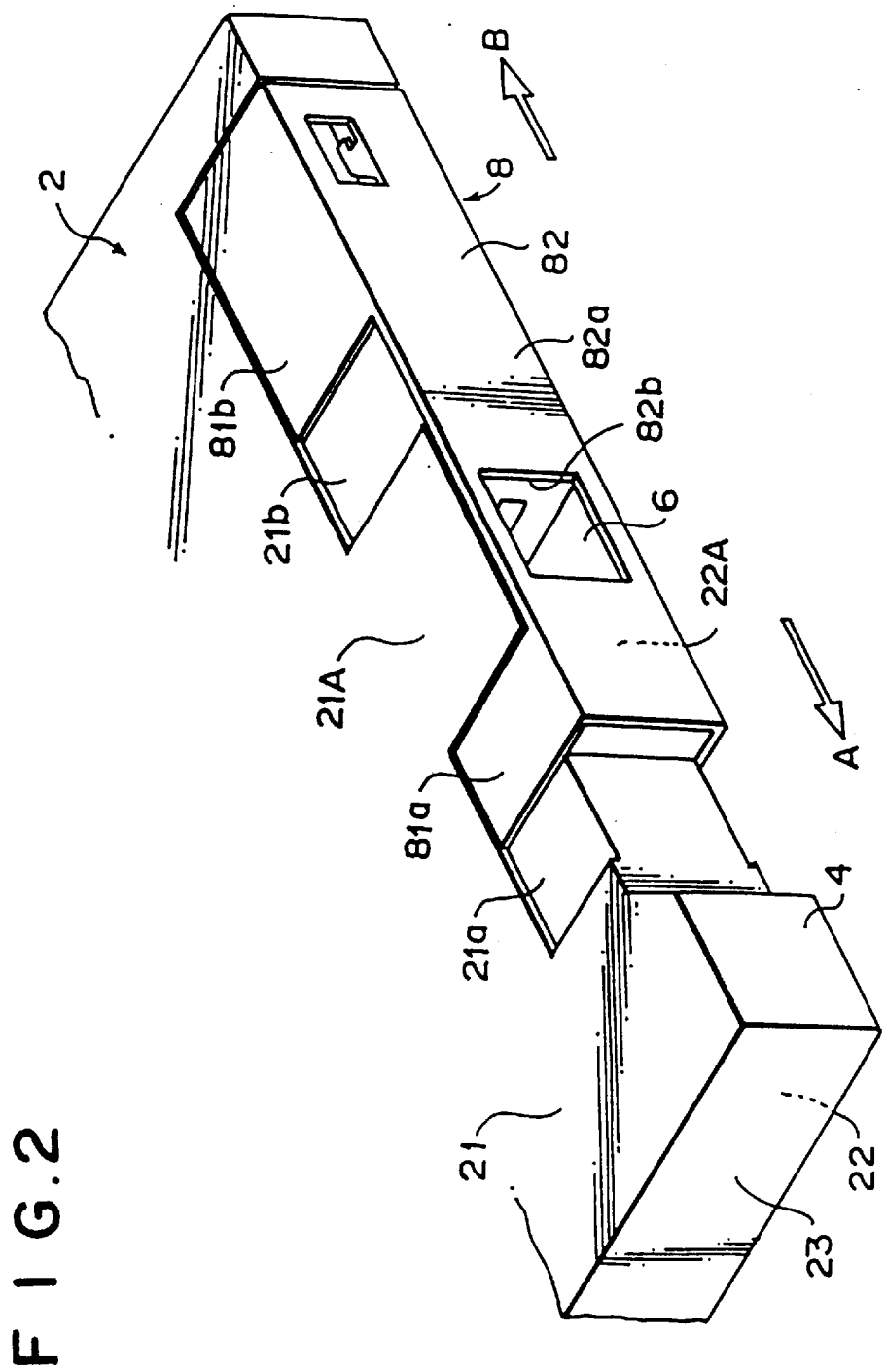
FIG. 2 is a partial perspective view of the first embodiment of the magnetic disk cartridge shown with its shutter member open.

FIGS. 1 and 2 are partial perspective views showing a magnetic disk cartridge which is a first embodiment of the invention. The magnetic disk cartridge is shown with its shutter member closed in FIG. 1 and open in FIG. 2.

The magnetic disk cartridge comprises a cassette shell 2 encasing a magnetic disk (not shown) so as to be freely rotatable therein. While the cassette shell 2 appears to be seamless in the figures, like the cassette shell of the prior-art magnetic disk cartridge it is formed of a pair of top and bottom cassette shell halves made of molded plastic. The cassette shell 2 is formed substantially as a flat hexahedron having an approximately square top surface 21 slightly larger than magnetic disk, a bottom surface 22 of substantially the same shape as the top surface 21 and lying parallel thereto, and narrow side surfaces 23 extending between the outer peripheral edges of the top surface 21 and the bottom surface 22. A magnetic head access opening 6 (FIG. 2) enabling magnetic recording and reproducing heads to be brought in contact with, or close to, the opposite surfaces of the magnetic disk from the exterior is formed in one side surface 4 among the four side surfaces 23. A slidable shutter member 8 for opening and closing the magnetic head access opening 6 is provided on the cassette shell 2. The shutter member 8 is constituted as a sectionally ⌒-shaped sheet member comprising, as interconnected, a pair of upper wings 81a, 81b extending along the top surface 21, a shutter section 82 extending along the one side surface 4 and a pair of lower wings (not shown) extending along the bottom surface 22 symmetrically with the upper wings 81a, 81b. The magnetic head access opening 6 is opened and closed by sliding the shutter member 8 back and forth along these surfaces.

Portions of the top surface 21 and the bottom surface 22 of the cassette shell 2 other than the portions 21A, 22A adjacent to the portion of the side surface 4 formed with the magnetic head access opening 6 are formed with recesses 21a, 21b for receiving and guiding the upper wings 81a, 81b and the lower wings of the shutter member 8. (The recess for receiving the lower wings are not shown in the figures.) The shutter member 8 is slidable along the surfaces of the cassette shell 2 in the directions of the arrows A and B with its upper wings 81a, 81b and lower wings received in and guided by the recesses 21a, 21b.

The mechanism for sliding the shutter member 8 along the surfaces of the cassette shell 2 provided in the device in which the magnetic disk cartridge is used (i.e., the mechanism comprising a guide groove, a guide leg engaged with the guide groove, and the like) can be of the same type as provided in devices for using the prior art magnetic disk cartridge.

In the embodiment described above, the members of each pair of upper wings 81a, 81b and lower wings of the shutter member 8 are located on opposite sides of the portion 21A of the top surface 21 or the portion 22A of the bottom surface 22 of the cassette shell 2 adjacent to the portion of the one side surface 4 formed with the magnetic head access opening 6, the shutter section 82 is located between and connected with the four wings of the two pairs of wings, and the shutter section 82 has a closed portion 82a sized to cover the magnetic head access opening 6 and an open portion 82b sized to open the magnetic head access opening 6.

The magnetic disk cartridge of this structure is used in the same manner as the prior-art magnetic disk cartridge. Specifically, it is loaded into the magnetic recording and reproducing device (hereinafter called simply "device") in the state shown in FIG. 1, i.e. with the magnetic head access opening 6 closed by the shutter member 8, by a pushing operation for insertion. At this time, the operating member provided in the device responds to the loading operation by sliding the shutter member 8 in the B direction to the open position shown in FIG. 2. Then, when the operator performs a prescribed operation for removing the magnetic disk cartridge from the device, for instance, when the operator presses a prescribed operating button of the device, the operating member of the device responds by sliding the shutter member 8 in the A direction to the closed position shown in FIG. 1. Since various types of device side mechanisms are available for conducting the opening and closing operations of the shutter member 8 and such a mechanism can easily be constituted as in conventional devices, a detailed explanation of such a mechanism will not be given here.

To facilitate the opening and closing operations of the shutter member 8, particularly that in the closing direction, the cassette shell 2 is preferably provided with biasing means (e.g., a spring) for urging the shutter member 8 in the closing direction. Since such a biasing means also serves to retain the shutter member 8 in the closed position at all times when the cartridge is not in use, its provision is also preferable from the viewpoint of preventing invasion of dust and the like.

In the embodiment of the magnetic disk cartridge described in the foregoing, the shutter section 82 of the shutter member 8 has the closed portion 82a sized to cover the magnetic head access opening 6 and, adjacent thereto, the open portion 82b sized to open the magnetic head access opening 6, and the members of each pair of upper wings 81a, 81b and lower wings of the shutter member 8, which are located on opposite sides of the portions 21A, 22A adjacent to the portion of the one side surface 4 formed with the magnetic head access opening 6, are connected through the shutter section 82. However, the upper wings 81a, 81b and the lower wings need not necessarily be connected through the shutter section 82 but can instead be connected through connecting portions located apart from the side surface 4. The second embodiment of the invention shown in FIGS. 3 and 4 is a case in point.

Figure 3:
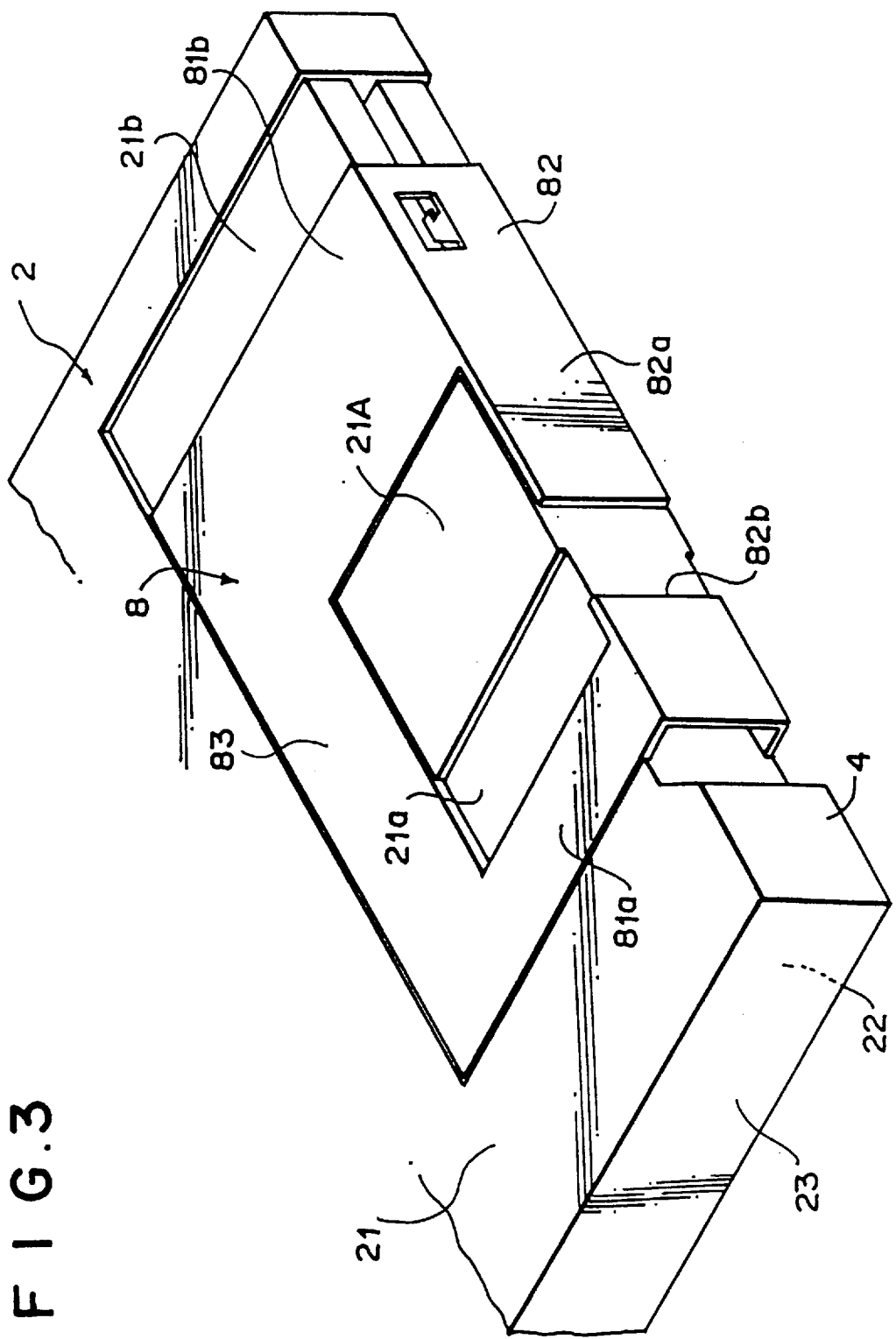
FIG. 3 is a partial perspective view of a magnetic disk cartridge which is a second embodiment of the invention shown with its shutter member closed.
Figure 4:
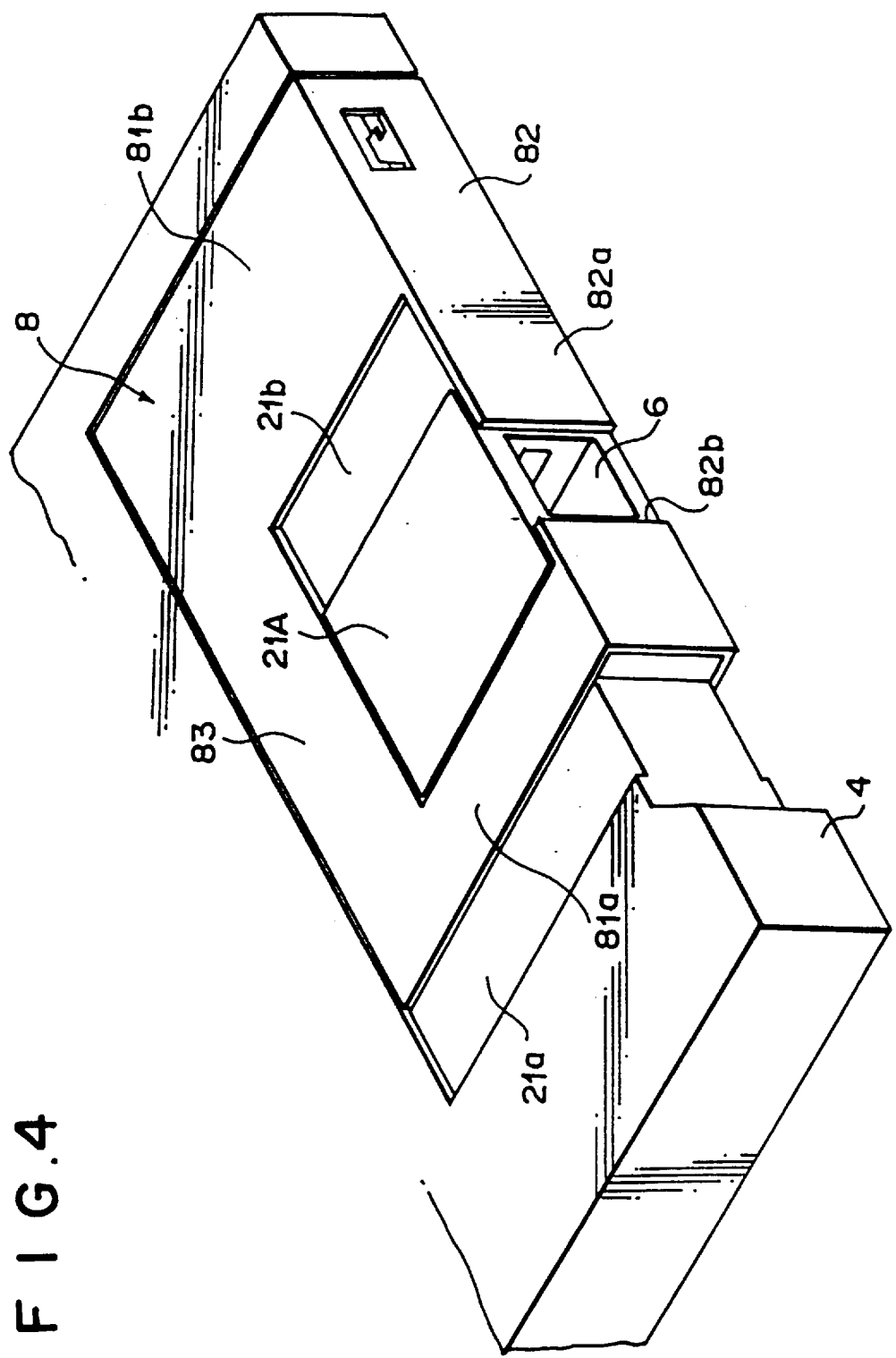
FIG. 4 is a partial perspective view of the second embodiment of the magnetic disk cartridge shown with its shutter member open.

The components in FIGS. 3 and 4 which are the same as those of the first embodiment shown in FIGS. 1 and 2 are assigned the same reference symbols as those FIGS. 1 and 2 and will not be explained further.

In this embodiment, the members of each pair of upper wings 81a, 81b and lower wings located on opposite sides of the portions 21A, 22A adjacent to the portion of the side surface 4 formed with the magnetic head access opening 6 are not connected through the shutter section 82 but are connected through upper and lower connecting portions 83 at positions apart from the side surface 4. Each connecting portion 83 is integral with, and lies in the same plane as, the upper wings 81a, 81b or the lower wings.

Specifically, in this embodiment the shutter member 8 has the pair of upper wings 81a, 81b and the pair of lower wings, with the members of each pair of wings being located apart from each other, and the shutter section 82 has two shutter subsections each connected with one upper wing and one lower wing. One of the shutter subsections constitutes the closed portion 82a of the shutter section and the open portion 82b of the shutter section is formed between the two shutter subsections.

Although the two upper wings 81a, 81b and the two lower wings are not connected through the shutter section 82, they are connected through the connecting portions 83 and, therefore, the shutter member 8 has rigidity as a whole.

Figure 5:
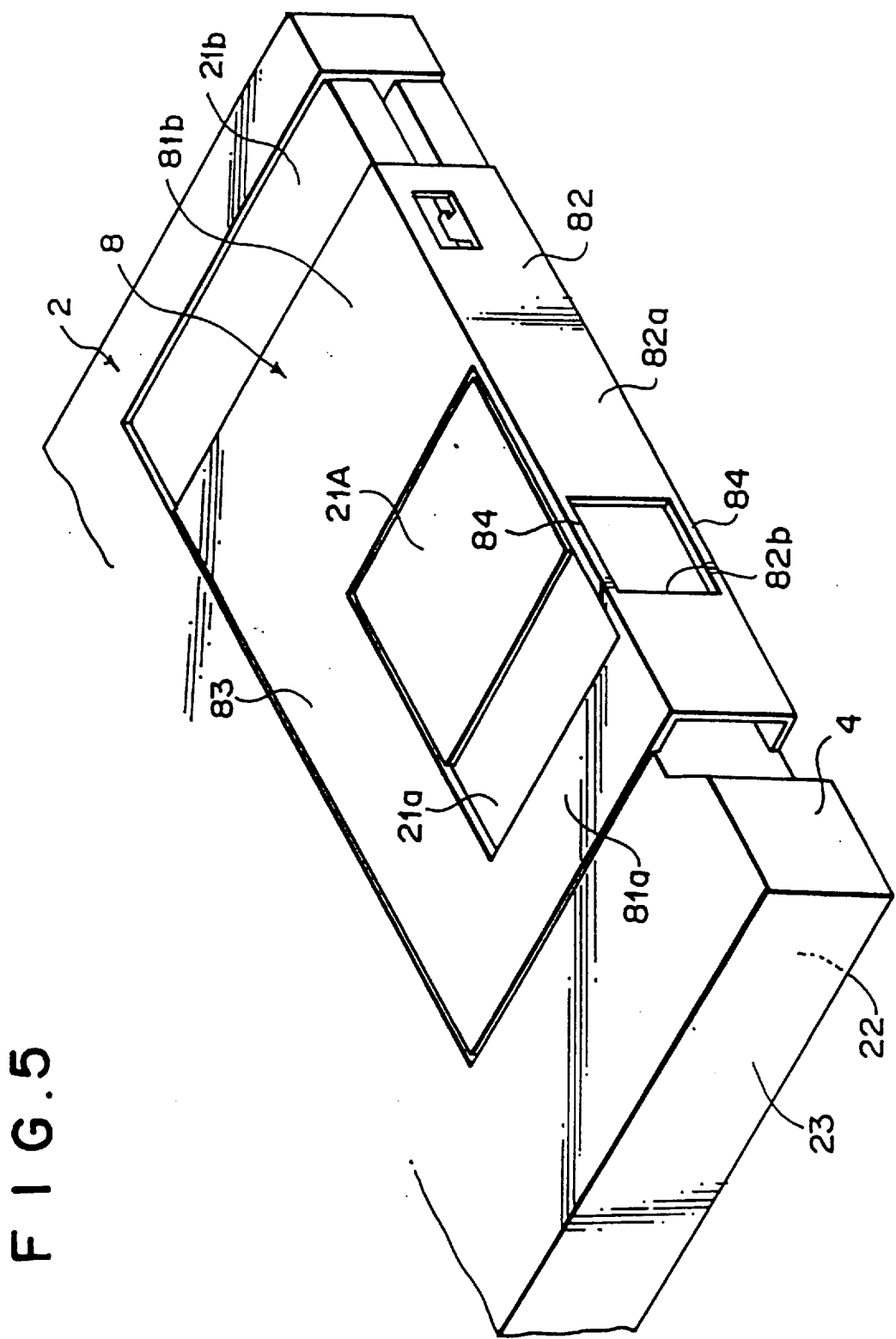
FIG. 5 is a partial perspective view of a magnetic disk cartridge which is a third embodiment of the invention shown with its shutter member closed.
Figure 6:
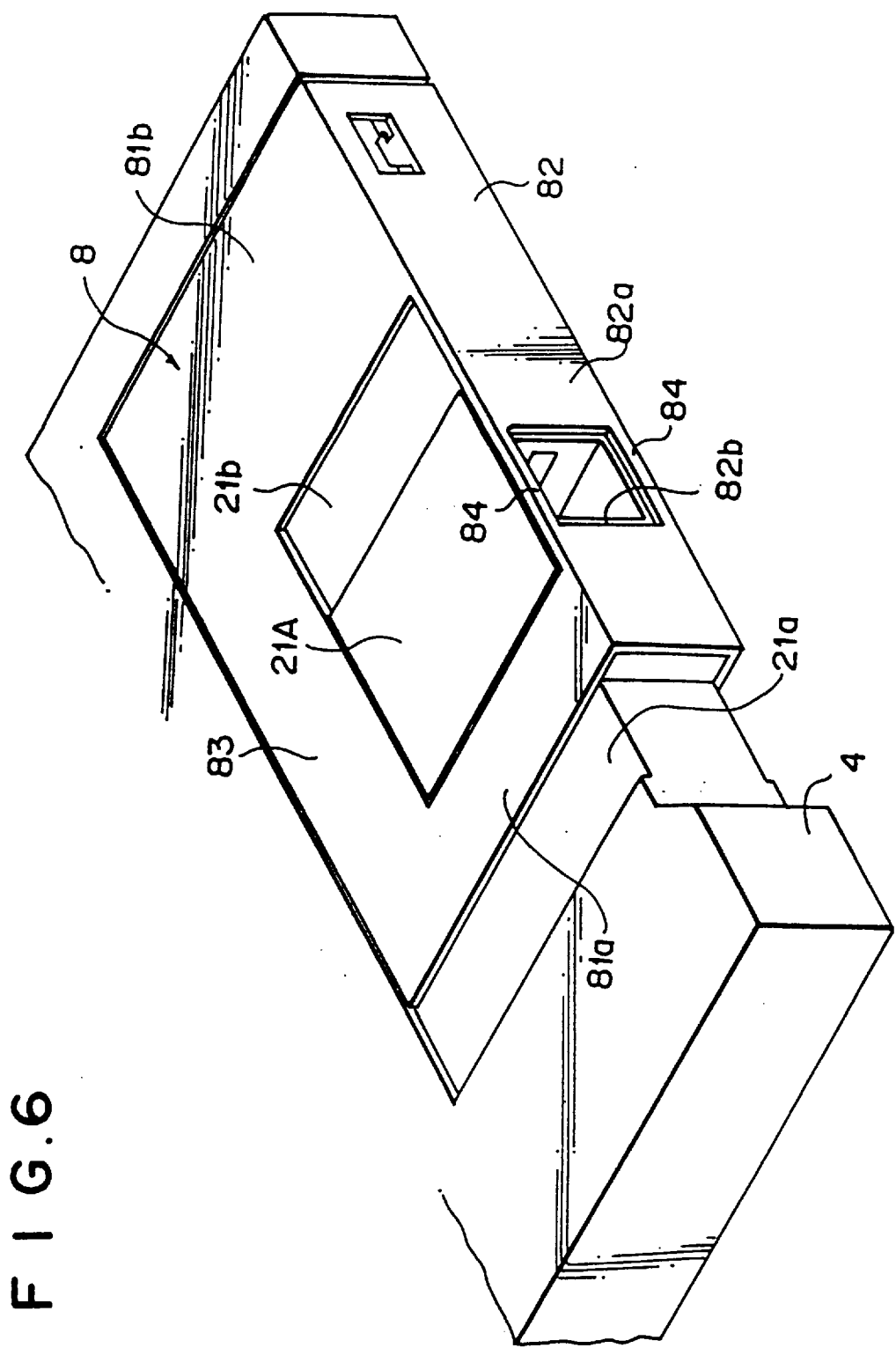
FIG. 6 is a partial perspective view of the third embodiment of the magnetic disk cartridge shown with its shutter member open.

The rigidity of the shutter section 82 of the second embodiment can be further enhanced by connecting the two shutter subsections with edge members. A configuration of this type is shown in FIGS. 5 and 6 as the third embodiment of the invention. The components in FIGS. 5 and 6 which are the same as those of the first embodiment shown in FIGS. 1 and 2 are assigned the same reference symbols as those FIGS. 1 and 2 and will not be explained further.

In this third embodiment, the two shutter subsections connected by the connecting portions 83 in the second embodiment are further connected by edge members 84 defining the opening of the open portion 82b.

In this embodiment, since the members of each pair of upper wings 81a, 81b and lower wings are connected by one of the connecting portions 83 and are further connected through the edge members 84 defining the opening of the open portion 82b, the shutter member 8 has high rigidity as a whole.

When the magnetic disk cartridge of the second or third embodiment is loaded in the device with the shutter member 8 closed, the operating member provided in the device responds to the loading operation by sliding the shutter member 8 to the open position. Then, when the operator performs a prescribed operation for removing the magnetic disk cartridge from the device, for instance, when the operator presses a prescribed operating button of the device, the operating member of the device responds by sliding the shutter member 8 to the closed position.

For the same reason as mentioned earlier, the second and third embodiments are also preferably provided with biasing means (e.g., a spring) for urging the shutter member 8 in the closing direction.

In order to stabilize retention of the shutter member 8 in the open position, any of the aforesaid three embodiments can be provided on portions of the inner surface of the shutter member 8 and the outer surface of the cassette shell 2 in sliding contact with each other with a projection and an indentation that are mutually engageable for providing a click-stop effect. This enhancement increases the freedom with which the operating mechanism of the device can be designed.

Since the invention provides the magnetic head access opening of the magnetic disk cartridge in one side surface of the cassette shell, the magnetic head access opening can be made small to minimize invasion of dust and the like into the interior of the cartridge. In addition, the shutter member for opening and closing the magnetic head access opening is constituted as a sectionally ⌐-shaped sheet member formed by interconnecting upper wings, a shutter section and lower wings that extend respectively along the top, one side and bottom surfaces of the cassette shell, and portions of the top surface and the bottom surface of the cassette shell other than those adjacent to the one side surface portion formed with the magnetic head access opening are formed with recesses for receiving and guiding the upper wings and the lower wings of the shutter member. Since sufficient wall thickness can therefore be secured at the portion of the cassette shell near the magnetic head access opening, the magnetic head access opening does not easily deform, exhibits stable strength, and the shutter member slidably mounted on the cassette shell is always able to slide smoothly.

What is claimed is:

1. A magnetic disk cartridge comprising:

a cassette shell rotatably encasing a magnetic disk and formed as a flat prism with a top surface slightly larger than the magnetic disk, a bottom surface of approximately the same shape as, and parallel to, the top surface, and narrow side surfaces extending between outer peripheral edges of the top and bottom surfaces, a magnetic head access opening formed in one of the narrow side surfaces of the cassette shell for enabling magnetic recording and reproducing heads to be brought in contact with, or close to, opposite surfaces of the magnetic disk from the exterior, and a shutter member constituted as a sectionally ⌐-shaped sheet member formed by interconnecting at least one upper wing, a shutter section and at least one lower wing that extend respectively along said top, one narrow side and bottom surfaces, wherein the shutter member is provided on the cassette shell to be slidable along said surfaces for opening and closing the magnetic head access opening and portions of the top surface and the bottom surface of the cassette shell other than those adjacent to the one narrow side surface portion formed with the magnetic head access opening are formed with recesses for receiving and guiding the upper wing and the lower wing of the shutter member, further wherein said recesses are formed on opposite sides of said portions, which are adjacent the magnetic head access opening, along a sliding direction of said shutter member.

2. A magnetic disk cartridge as defined in claim 1, wherein the shutter member has a pair of upper wings and a pair of lower wings, the members of each pair of wings are located on opposite sides of the top surface portion or the bottom surface portion adjacent to the one side surface portion formed with the magnetic head access opening, the shutter section is located between and connected with the four wings of the two pairs of wings, and the shutter section has a closed portion sized to cover the magnetic head access opening and an open portion adjoining the closed portion and sized to open the magnetic head access opening.

3. A magnetic disk cartridge as defined in claim 2, further comprising biasing means for urging the shutter member in the direction of closing the magnetic head access opening.

4. A magnetic disk cartridge as defined in claim 1, wherein the shutter member has a pair of upper wings and a pair of lower wings with the members of each pair of wings being located on opposite sides of the top surface portion or the bottom surface portion adjacent to the one side surface portion formed with the magnetic head access opening and being connected by a connecting portion at a position apart from the one side surface, the shutter section is located between and connected with the four wings of the two pairs of wings, and the shutter section has a closed portion sized to cover the magnetic head access opening and an open portion adjoining the closed portion and sized to open the magnetic head access opening.

5. A magnetic disk cartridge as defined in claim 4, wherein the shutter section has two shutter subsections each connected with one upper wing and one lower wing, one of the shutter subsections constituting the closed portion of the shutter section, and the two shutter subsections being separated from each other to form therebetween a space constituting the open portion of the shutter section.

6. A magnetic disk cartridge as defined in claim 5, further comprising biasing means for urging the shutter member in the direction of closing the magnetic head access opening.

7. A magnetic disk cartridge as defined in claim 4, wherein the shutter section has two shutter subsections each connected with one upper wing and one lower wing, one of the shutter subsections constituting the closed portion of the shutter section, the two shutter subsections being separated from each other to form therebetween a space constituting the open portion of the shutter section, and the two shutter subsections be connected by edge members defining the opening of the open portion.

8. A magnetic disk cartridge as defined in claim 7, further comprising biasing means for urging the shutter member in the direction of closing the magnetic head access opening.

9. A magnetic disk cartridge as defined in claim 4, further comprising biasing means for urging the shutter member in the direction of closing the magnetic head access opening.

10. A magnetic disk cartridge as defined in claim 1, further comprising biasing means for urging the shutter member in the direction of closing the magnetic head access opening.

* * * * *